(12) United States Patent
Kazaryan et al.

(10) Patent No.: US 7,446,998 B2
(45) Date of Patent: Nov. 4, 2008

(54) CURRENT COLLECTOR FOR A DOUBLE ELECTRIC LAYER CAPACITOR

(75) Inventors: Samvel Avakovich Kazaryan, Troitsk (RU); Valery Pavlovich Nedoshivin, Solnechnogorsky District (RU); Vladimir Alexandrovich Kazarov, Troitsk (RU); Gamir Galievich Kharisov, Troitsk (RU); Sergey Vitalievich Litvinenko, Zelenograd (RU); Sergey Nikolaevich Razumov, Moscow (RU)

(73) Assignee: Universal Supercapacitors LLC, Columbus, OH (US)

( * ) Notice: Subject to any disclaimer, the term of this patent is extended or adjusted under 35 U.S.C. 154(b) by 267 days.

(21) Appl. No.: 11/358,981

(22) Filed: Feb. 22, 2006

(65) Prior Publication Data

US 2006/0292384 A1    Dec. 28, 2006

(51) Int. Cl.
*H01G 9/00* (2006.01)
(52) U.S. Cl. ...................... 361/502; 361/503
(58) Field of Classification Search .......... 361/502–503
See application file for complete search history.

(56) References Cited

U.S. PATENT DOCUMENTS

| | | | |
|---|---|---|---|
| 3,601,665 A | | 8/1971 | O'Nan et al. |
| 3,634,736 A | * | 1/1972 | Boos et al. ................. 361/502 |
| 3,652,902 A | * | 3/1972 | Hart et al. .................. 361/502 |
| 4,438,481 A | | 3/1984 | Phillips et al. |
| 4,562,511 A | | 12/1985 | Nishino et al. |
| 4,605,989 A | * | 8/1986 | Marse et al. ............... 361/502 |
| 4,697,224 A | | 9/1987 | Watanabe |
| 5,045,170 A | | 9/1991 | Bullock et al. |
| 5,065,286 A | | 11/1991 | Kurabayashi et al. |
| 5,072,335 A | | 12/1991 | Kurabayashi et al. |

(Continued)

FOREIGN PATENT DOCUMENTS

CA    2137323    6/1995

(Continued)

OTHER PUBLICATIONS

Evans, David A. & Miller, John R., Hybrid Electrolytic/Electrochemical Capacitor for Electric Vehicles, Proceedings—Electrochemical Society, 1997, pp. 253-257, vol. 96-25.

(Continued)

*Primary Examiner*—Eric Thomas
(74) *Attorney, Agent, or Firm*—Standley Law Group LLP

(57) ABSTRACT

A current collector for use in a capacitor having an aqueous or non-aqueous electrolyte, such as an aqueous sulfuric acid electrolyte. The conductive basis of the current collector may be manufactured from a number of conductive metals but, preferably, is comprised of lead or a lead alloy. The portion of the conductive basis that will be in contact with the electrolyte is provided with a protective layer that is created by deposition of one or more layers of one or more protective coating materials thereto. Each protective coating material is comprised of at least a conductive carbon powder and a polymer binder that is resistant to the electrolyte. Preferably, but not essentially, the protective coating material(s) are applied to the conductive basis in the form of a paste, which is subsequently subjected to a solvent evaporation step and a thermal treatment step. The resulting protective layer is also substantially devoid of pores through which the electrolyte can permeate.

37 Claims, 10 Drawing Sheets

U.S. PATENT DOCUMENTS

| | | |
|---|---|---|
| 5,072,336 A | 12/1991 | Kurabayashi et al. |
| 5,072,337 A | 12/1991 | Kurabayashi et al. |
| 5,080,963 A | 1/1992 | Tatarchuk et al. |
| 5,099,398 A | 3/1992 | Kurabayashi et al. |
| 5,102,745 A | 4/1992 | Tatarchuk et al. |
| 5,121,301 A | 6/1992 | Kurabayashi et al. |
| 5,142,451 A | 8/1992 | Kurabayashi et al. |
| 5,187,033 A | 2/1993 | Koshiba |
| 5,262,254 A | 11/1993 | Koksbang et al. |
| 5,304,330 A | 4/1994 | Tatarchuk et al. |
| 5,369,547 A | 11/1994 | Evans |
| 5,392,191 A | 2/1995 | Thomas et al. |
| 5,429,893 A | 7/1995 | Thomas |
| 5,441,830 A | 8/1995 | Moulton et al. |
| 5,464,453 A | 11/1995 | Tong et al. |
| 5,464,706 A | 11/1995 | Dasgupta et al. |
| 5,464,707 A | 11/1995 | Moulton et al. |
| 5,478,676 A | 12/1995 | Turi et al. |
| 5,518,839 A | 5/1996 | Olsen |
| 5,527,640 A | 6/1996 | Rudge et al. |
| 5,547,782 A | 8/1996 | Dasgupta et al. |
| 5,568,353 A | 10/1996 | Bai et al. |
| 5,578,396 A | 11/1996 | Fauteux et al. |
| 5,578,399 A | 11/1996 | Olsen |
| 5,580,686 A | 12/1996 | Shi et al. |
| 5,600,535 A | 2/1997 | Jow et al. |
| 5,604,660 A | 2/1997 | Bai et al. |
| 5,621,607 A | 4/1997 | Farahmandi et al. |
| 5,714,053 A | 2/1998 | Howard |
| 5,729,427 A | 3/1998 | Li et al. |
| 5,777,428 A | 7/1998 | Farahmandi et al. |
| 5,824,436 A | 10/1998 | Lian et al. |
| 5,955,215 A | 9/1999 | Kurzweil et al. |
| 5,986,876 A | 11/1999 | Stepanov et al. |
| 6,031,711 A | 2/2000 | Tennent et al. |
| 6,031,712 A | 2/2000 | Kurihara et al. |
| 6,059,847 A | 5/2000 | Farahmandi et al. |
| 6,063,143 A | 5/2000 | Stepanov et al. |
| 6,064,561 A | 5/2000 | Harada et al. |
| 6,088,217 A | 7/2000 | Patel et al. |
| 6,181,545 B1 | 1/2001 | Amatucci et al. |
| 6,181,546 B1 | 1/2001 | Stepanov et al. |
| 6,187,061 B1 | 2/2001 | Amatucci et al. |
| 6,195,252 B1 | 2/2001 | Belyakov et al. |
| 6,201,685 B1 | 3/2001 | Jerabek et al. |
| 6,205,016 B1 | 3/2001 | Niu |
| 6,222,723 B1 | 4/2001 | Razoumov et al. |
| 6,335,857 B1 | 1/2002 | Takimoto et al. |
| 6,335,858 B1 | 1/2002 | Vasechkin et al. |
| 6,339,529 B1 | 1/2002 | Kasahara et al. |
| 6,341,057 B1 | 1/2002 | Nissen et al. |
| 6,343,003 B1 | 1/2002 | Sakata et al. |
| 6,349,027 B1 | 2/2002 | Suhara et al. |
| 6,350,520 B1 | 2/2002 | Nesbitt et al. |
| 6,353,528 B1 | 3/2002 | Hori et al. |
| 6,356,432 B1 | 3/2002 | Danel et al. |
| 6,356,433 B1 | 3/2002 | Shi et al. |
| 6,379,402 B1 | 4/2002 | Suhara et al. |
| 6,383,427 B2 | 5/2002 | Ishikawa et al. |
| 6,383,640 B1 | 5/2002 | Shi et al. |
| 6,402,792 B1 | 6/2002 | Hiratsuka et al. |
| 6,414,836 B1 | 7/2002 | Tennent et al. |
| 6,426,862 B1 | 7/2002 | Vasechkin et al. |
| 6,430,031 B1 | 8/2002 | Dispennette et al. |
| 6,449,139 B1 | 9/2002 | Farahmandi et al. |
| 6,454,815 B1 | 9/2002 | Finello et al. |
| 6,466,429 B1 | 10/2002 | Volfkovich et al. |
| 6,491,789 B2 | 12/2002 | Niu |
| 6,493,210 B2 | 12/2002 | Nonaka et al. |
| 6,503,432 B1 | 1/2003 | Barton et al. |
| 6,510,043 B1 | 1/2003 | Shiue et al. |
| 6,512,667 B2 | 1/2003 | Shiue et al. |
| 6,515,845 B1 | 2/2003 | Oh et al. |
| 6,522,522 B2 | 2/2003 | Yu et al. |
| 6,563,694 B2 | 5/2003 | Kim et al. |
| 6,574,092 B2 | 6/2003 | Sato et al. |
| 6,576,365 B1 | 6/2003 | Meitav et al. |
| 6,602,742 B2 | 8/2003 | Maletin et al. |
| 6,614,646 B2 | 9/2003 | Bogaki et al. |
| 6,628,504 B2 | 9/2003 | Volfkovich et al. |
| 6,631,074 B2 | 10/2003 | Bendale et al. |
| 6,702,963 B2 | 3/2004 | Kibi et al. |
| 6,706,079 B1 | 3/2004 | Shmatko et al. |
| 6,762,926 B1 | 7/2004 | Shiue et al. |
| 6,773,468 B2 | 8/2004 | Lang |
| 6,830,595 B2 | 12/2004 | Reynolds |
| 6,855,273 B2 | 2/2005 | Ravet et al. |
| 6,876,539 B2 | 4/2005 | Michel et al. |
| 6,924,063 B2 | 8/2005 | Che et al. |
| 6,937,460 B2 | 8/2005 | Lang |
| 6,940,706 B2 | 9/2005 | Sakata et al. |
| 6,962,666 B2 | 11/2005 | Ravet et al. |
| 6,967,183 B2 | 11/2005 | Hampden-Smith et al. |
| 7,006,346 B2 | 2/2006 | Volkovich et al. |
| 2002/0048144 A1 | 4/2002 | Sugo et al. |
| 2002/0114126 A1 | 8/2002 | Hirahara et al. |
| 2002/0122980 A1 | 9/2002 | Fleischer et al. |
| 2002/0122985 A1 | 9/2002 | Sato et al. |
| 2002/0136946 A1 | 9/2002 | Amatucci et al. |
| 2003/0031926 A1 | 2/2003 | Farmer et al. |
| 2003/0036001 A1 | 2/2003 | James et al. |
| 2003/0070916 A1 | 4/2003 | Nanno et al. |
| 2003/0118884 A1 | 6/2003 | Hampden-Smith et al. |
| 2004/0120100 A1 | 6/2004 | Reynolds |
| 2004/0131944 A1 | 7/2004 | Visco et al. |
| 2004/0140458 A1 | 7/2004 | Ravet et al. |
| 2004/0141282 A1 | 7/2004 | Hudis |
| 2004/0191617 A1 | 9/2004 | Visco et al. |
| 2004/0197641 A1 | 10/2004 | Visco et al. |
| 2004/0199015 A1 | 10/2004 | Yuyama et al. |
| 2005/0007727 A1 | 1/2005 | Lang |
| 2005/0019656 A1 | 1/2005 | Yoon et al. |
| 2005/0089754 A1 | 4/2005 | Lang |
| 2005/0141170 A1 | 6/2005 | Honda et al. |
| 2005/0271798 A1 | 12/2005 | Zhong et al. |

FOREIGN PATENT DOCUMENTS

| | | |
|---|---|---|
| EP | 0680061 | 11/1995 |
| EP | 0763836 | 3/1997 |
| EP | 1043744 | 10/2000 |
| EP | 1156500 | 11/2001 |
| EP | 1013506 | 6/2002 |
| WO | 96/12313 | 4/1996 |
| WO | 9924996 | 5/1999 |
| WO | 0033336 | 6/2000 |
| WO | 0219357 | 3/2002 |
| WO | 03/098648 | 11/2003 |

OTHER PUBLICATIONS

Varakin, I.N., Klementov, A.D., Litvinenko, S.V., Starodubtsev, N.F., & Stepanov, A.B., Electrochemical Ultracapacitors and Modules of "ESMA" Company, Official Proceedings 11th Int. Power Quality, Nov. 1998, pp. 90-98.

* cited by examiner

CURRENT COLLECTOR FOR A DOUBLE ELECTRIC LAYER CAPACITOR

This application claims the benefit of PCT Application Ser. No. PCT/RU05/000349, filed on Jun. 24, 2005.

BACKGROUND OF THE INVENTION

The present invention is directed to the field of electrochemical capacitors, and particularly electrochemical supercapacitors. More specifically, the present invention is directed to a current collector for use in a double electric layer electrochemical supercapacitor electrode assembly.

There is an increasing focus on the use of capacitors as a means for storing electrical energy. These capacitors can efficiently store and redistribute a large amount of electrical energy. For example, such capacitors may be used: as a main power supply; as a back-up power supply; and for power quality assurance (e.g., to compensate for short-term power "surges", "spikes", and "skips" common to utility-supplied electric power). Such capacitors may also be used to provide load-leveling by storing an amount of electrical energy provided during off-peak hours and thereafter re-distributing said electrical energy during periods of peak demand. It is also possible to use such capacitors as a primary or secondary power source in situations where a portable source of power is required, such as with a variety of vehicles.

A double electric layer (DEL) capacitor typically comprises a pair of electrodes residing in a spaced apart relationship, between which resides an electrolyte. The electrolyte can be either aqueous or non-aqueous in nature, depending on the composition of the electrodes. A separator typically also resides in the space between the electrodes.

One or both of the electrodes in a DEL capacitor may store electrical energy through a double layer electrochemical mechanism. In a double electric layer storage process, a layer of electrons forms at the electrode side of the electrode/electrolyte interface. A layer of positive ions also forms on the electrolyte side of the electrode/electrolyte interface. The voltage across the electrode/electrolyte interface increases with charge accumulation, and is eventually released during discharge of the capacitor.

One or both of the electrodes of a DEL capacitor may generally be polarizable electrodes—although, it has been found that constructing a DEL capacitor with one polarizable electrode and one non-polarizable electrode provides the DEL capacitor with a specific energy capacity that is greater than that of a capacitor with two polarizable electrodes. The polarizable electrode may comprise, for example, an active material and a current collector to which the active material is affixed. The most commonly employed active material is one of a plurality of activated carbon materials.

Each of the electrodes of such a DEL capacitor is typically affixed by some means to a current collector. Current collectors are commonly constructed of a material that exhibits good electrical conductivity—typically a metal. As at least a portion of the current collector must reside in the electrolyte along with the electrode material, it must be ensured that the current collector material will not react adversely thereto. For example, the electrolyte of a DEL capacitor may consist of an aqueous sulfuric acid solution or some other aqueous or non-aqueous material. In such a case, it must be ensured that the electrolyte will not erode or corrode the current collector material, such as through an oxidation-reduction (redox) process.

Consequently, while various embodiments of DEL capacitor current collectors are known, each typically has one or more inherent disadvantages. For example, since different electrochemical capacitors utilize different electrolytes and different active mass materials, current collectors for use therewith should have certain corresponding electrochemical, physical, electrical, mechanical and processing characteristics. This has led to the need for a wide variety of different current collector materials.

Further, using materials such as sulfuric acid for the electrolyte in a DEL capacitor eliminates as an option a variety of inexpensive metals or alloys that could be used in constructing a current collector. Because such materials demonstrate low stability in the specified electrolyte, their use would significantly narrow the capacitor operating voltage window and result in a decrease in specific energy and power parameters of the capacitor. Thus, DEL capacitors have commonly employed current collector materials that exhibit better stability in such electrolytes, which materials are typically expensive to procure. Such materials may include, for example, Ti, Al, Ni, Ag, Nb, Ta, W and a variety of alloys thereof.

It is possible to use more inexpensive materials such as steel and similar metals to form a current collector of a DEL capacitor. However, because such metals are not sufficiently resistant to certain electrolytes (e.g., sulfuric acid electrolytes), known DEL current collector designs making use of such metals have also required the use of a protective coating that is resistant to the electrolyte used in the capacitor. Without the protective coating, a current collector comprised of steel or a similar metal will degrade in the presence of a sulfuric acid electrolyte—such as by corrosion. Current collector corrosion can have a negative effect on the cycling capacity and service life of a capacitor.

As one example of a known design of this nature, a steel current collector may utilize a protective layer of graphite foil. While this and other similar coating materials may offer acceptable resistance to the electrolyte in which they reside, there has been a great deal of difficulty in obtaining adequate adhesion between such protective coatings and the subjacent electrode materials. As a result, the electrolyte eventually intrudes between the protective coating and the current collector, whereafter corrosion of the current collector material occurs.

It should be realized that any degradation or erosion of such a metal current collector can adversely effect performance of a DEL capacitor. For example, when a sulfuric acid electrolyte is used, even substantially insignificant quantities of iron present therein can harshly decrease the decomposition voltage of the electrolyte and result in a significant reduction in the operating voltage of the capacitor. Hence, degradation of the current collector should be avoided.

As can be understood from the foregoing discussion, there are several disadvantages associated with known DEL capacitor current collector designs. Thus, current collectors of the present invention utilizes an improved design that substantially reduces or eliminates many of the problems associated with known current collectors.

SUMMARY OF THE INVENTION

A current collector of the present invention is designed in view of the aforementioned requirements and concerns. For example, it is understood that the material used to construct a current collector can affect various capacitor parameters, such as: maximum operating voltage; operating temperature; operating stability; the range of electrolytes that can be used; service life; and cost. Based on the foregoing limitations, including the variety of different materials that may be used to form the active mass of a DEL capacitor electrode, it has been determined that the most suitable material for constructing a current collector for a DEL capacitor having a sulfuric acid aqueous solution (sulfuric acid) electrolyte is lead or a lead alloy. These materials are very stable when exposed to a sulfuric acid electrolyte, exhibit high over-voltage of hydrogen and oxygen gassing, and are readily available at low cost.

However, it has also been determined that after extended operation of such DEL capacitors, a thin oxidation layer with high specific resistance and low stability will be formed by a redox process on the surface of unprotected lead or lead alloy-based current collectors. This results in a decrease of energy and power parameters, operating stability, and reliability.

As such, a current collector of the present invention is provided with a specialized protective layer that prevents an oxidation layer from forming on the lead-based collector material when the current collector is exposed to the sulfuric acid electrolyte of a DEL capacitor. The protective layer is coated to the metal current collector body prior to attachment of the electrode active mass thereto. Consequently, the protective layer must allow for good adhesion with the active mass and must allow for efficient charge transfer from the active mass to the current collector. Multiple layers of one or more protective coating material compositions can be applied to the current collector to produce a protective coating that provides both acceptable protection and adhesion.

Because the active mass of most electrochemical capacitors is formed using an activated carbon material which has p-type conductivity, the protective coating should also exhibit p-type conductivity. The main ingredients of the protective coating material are preferably a finely dispersed carbon powder(s) having high p-type conductivity, and one or more specific polymer binders, such as a perchlorovinyl-based resin. Preferably, the polymer material selected will also provide for a protective coating composition that is sufficiently devoid of micro-pores.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1b is a side view of the current collector of FIG. 1a;

DETAILED DESCRIPTION OF THE EXEMPLARY EMBODIMENT(S)

Figure 1B:
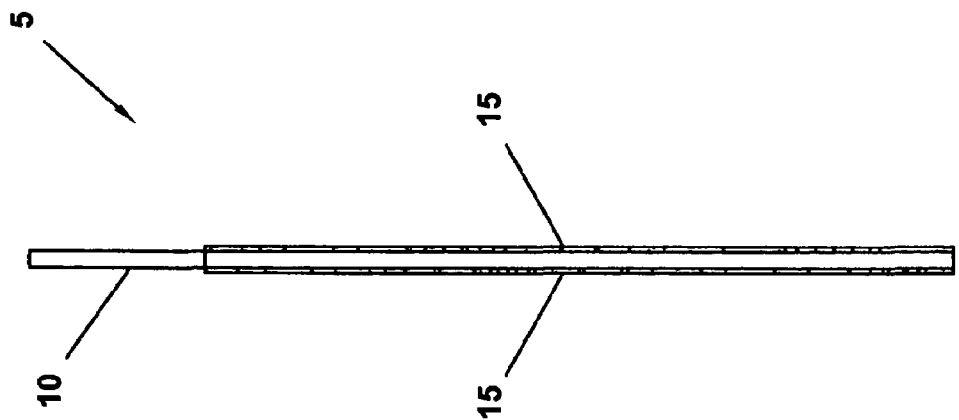
Figure 1A:
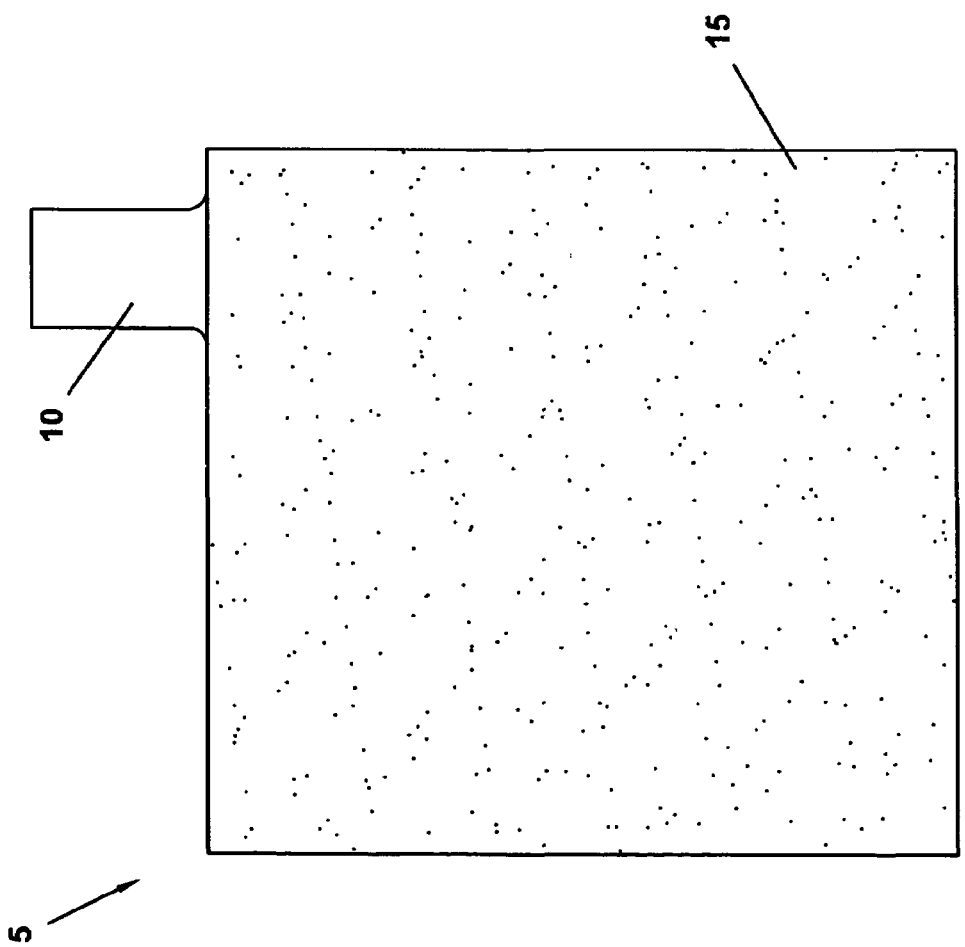
FIG. 1a is a front view depicting an exemplary embodiment of a current collector with a protective layer according to the present invention.

One exemplary embodiment of a current collector of the present invention can be observed in FIGS. 1a-1b. As can be seen, the current collector 5 has an inner conductive basis 10 and a outer protective layer 15. The conductive basis 10 of this embodiment is comprised of lead or a lead alloy such as, for example, a mixture of lead and tin.

The material forming the protective layer 15 is comprised primarily of a finely dispersed carbon powder(s) having high p-type conductivity, and one or more specific polymer binders. The carbon powder may have an initial particle size range of about 3,000-8,000 Å, although other particle sizes may also be available. Preferably, however, the carbon powder particles are further reduced in size. Preferably, the carbon powder particles are further reduced in size such that their linear dimensions do not exceed approximately 300-500 Å.

It has been discovered that only a limited number of polymer materials will provide for a protective coating composition that is sufficiently devoid of micropores. These polymer materials include, without limitation: perchlorovinyl; chlorosulfated polyethylene; epoxy resins; polyurethane resins; and Poviden F (a copolymer of vinyliden chloride with vinyl chloride). Other materials present in the protective layer may include, without limitation, plasticizers, solvents, dispersants, and wetting and anti-foaming agents.

Figure 2:
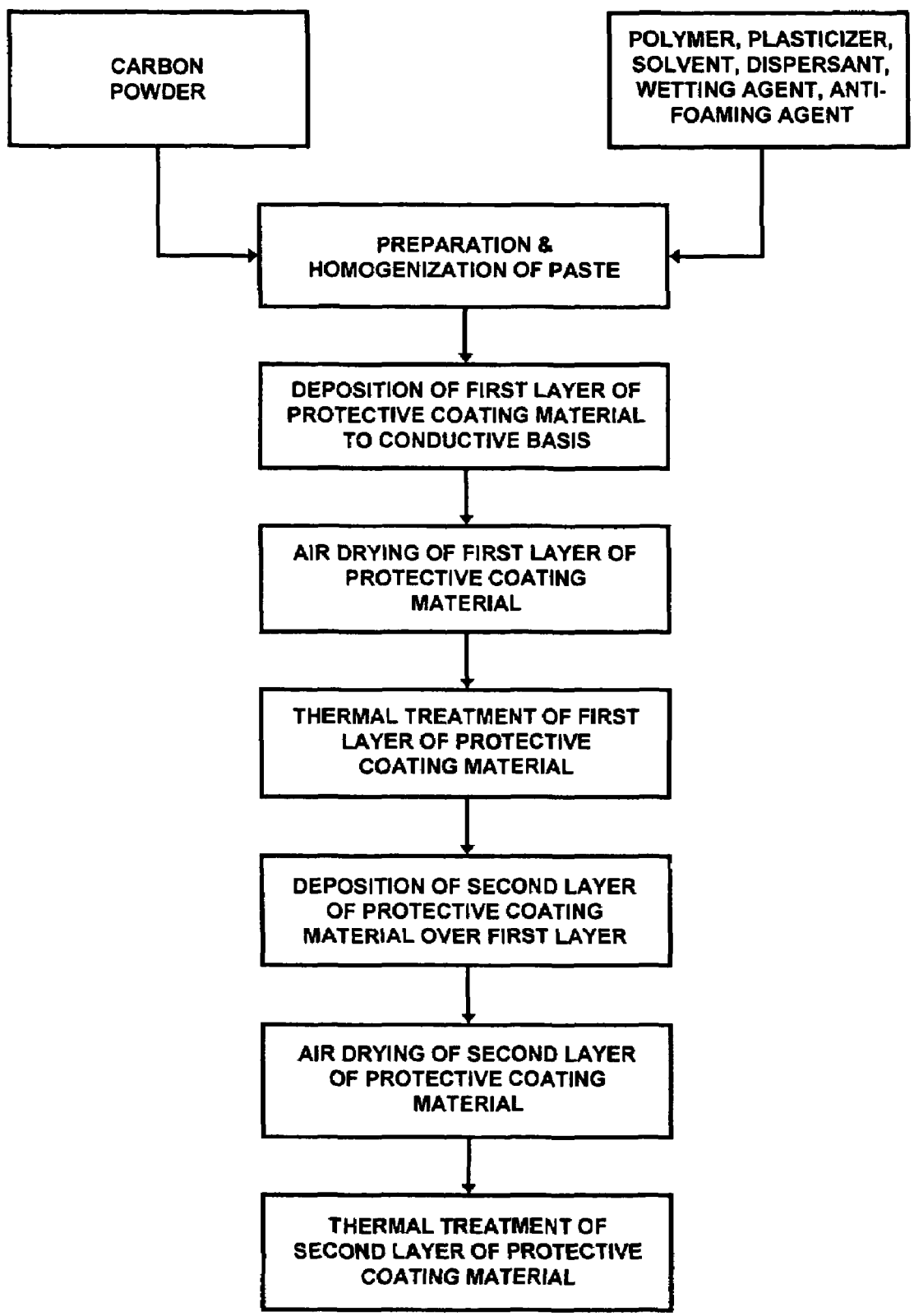
FIG. 2 is a block diagram illustrating the steps of an exemplary method of manufacturing a current collector of the present invention.

An exemplary method of manufacturing a protective coating material and a current collector with a two-layer protective layer can be understood by reference to FIG. 2 and the following description. As shown, the conductive basis 10 of the current collector 5 is manufactured from lead or a lead alloy to predetermined dimensions. For example, in the embodiment shown in FIG. 1, the conductive basis 10 is manufactured from a lead alloy comprising a mixture of lead and tin to dimensions of approximately 135×72×0.2(mm). Of course, it should be realized by one skilled in the art that the conductive basis 10 may have a multitude of other dimensions depending on the electrode and capacitor of which it will form a part. The conductive basis 10 may be produced by machining, molding, or any other technique familiar to one skilled in the art.

In order to assure that no adhesion-reducing contaminants will reside between the conductive basis 10 and the later-applied protective coating material, it is preferred that the relevant surfaces of the conductive basis be cleaned after forming. For example, it has been found that cleaning the surfaces of the conductive basis 10 with acetone and toluol does a good job of removing any fat and dirt that may be present thereon. Certainly, one skilled in the art would recognize that other cleaners could also be effectively used on the conductive basis 10.

It is also preferred that the relevant surfaces of the conductive basis 10 be roughened in order to maximize adhesion. This may be accomplished in any number of ways that would be understood by one skilled in the art. For example, it has been found that scrubbing the relevant surfaces of the conductive basis 10 with a metal brush works well for this purpose.

Once the conductive basis has been produced and readied, the protective coating material can be prepared. As stated above, the primary components of the protective coating material are finely a dispersed carbon powder(s) and one or more specific polymer binders. As also discussed above, the protective coating material may also include without limitation, plasticizers, solvents, dispersants, wetting agents and anti-foaming agents.

Carbon powder material of acceptable particle size is first obtained. The carbon powder may be purchased or manufactured. To the carbon powder is added the polymer binder, and any of the other aforementioned materials. The weight ratio of materials used in the protective coating may vary. In Example 1, below, for example: 6.0 weight % of carbon powder, 8.2 weight % of polymer, 5.2 weight % of plasticizer, 80.0 weight % of solvent, 0.3 weight % of dispersant, 0.15 weight % of wetting agent, and 0.15 weight % of anti-foaming agent were mixed to form the protective coating material. Of course, the particular ratios used may vary depending on the particular materials involved and/or the brand of the materials, and the exemplary composition recited above and below is not to be viewed as limiting a protective coating material of the present invention to the particular materials or ratios listed.

The carbon powder, polymer binder, and other materials are preferably processed into a paste. This may be accomplished in several ways that would be familiar to one skilled in the art. For example, the various components of the protective coating material may be added to a laboratory mill, such as a Dyno Mill Multi-Lab device. During paste preparation, any larger carbon powder particles are preferably reduced in size to less than about 500 Å and, more preferably, to between approximately 300-500 Å, and the ingredients are worked into a homogeneous paste. Once a homogeneous paste has been produced, it is removed to a homogenizer and mixed therein for a predetermined amount of time. Exemplary milling and homogenization times may be, for example, 45 minutes and 20 minutes, respectively. Of course, these times may vary considerably depending on the exact paste composition and the devices used to mix and homogenize the paste.

After homogenization, the paste is preferably filtered to remove any large coagulated carbon powder particles. In one exemplary method, a ceramic filter having a maximum pore diameter of about 5 µm is used for this purpose.

Once the paste has been filtered, it is ready to apply to the conductive basis 10. A specially designed paste deposition device (not shown) has been produced for this purpose, but other known methods of paste application can also be employed. The specially designed paste deposition device (or a similar device/method) is preferred, however, because it allows for excellent control over the thickness of each protective coating layer applied to the conductive basis 10.

The protective coating material may be applied to the conductive basis 10 in a single layer. However, it has been discovered that applying multiple layers of protective coating material produces a protective layer 15 with improved properties. This is believed to be true for a number of reasons. For example, it has been found that when the protective coating material is applied in multiple layers, the number of major defects in the overall protective layer 15 is greatly lessened and the density of the protective layer's micro-pores is reduced. This improves the operating parameters of the current collector 5. An increase in of the number of individually applied protective coating material layers brings about an improvement in overall protective layer and collector quality—even if the aggregate thickness of the overall protective layer 15 remains constant.

Furthermore, applying the protective coating material in multiple layers allows for the overall protective layer 15 to be comprised of individual protective coating materials containing different polymers. This is an important manufacturing option, as it is often difficult if not impossible to simultaneously meet all the aforementioned requirements of a protective layer when using a protective coating material(s) having only one type of polymer.

More specifically, it has been found that, as a general rule, polymer materials exhibiting the best adhesion to a lead-based conductive basis 10 are also characterized by being highly penetrable by a sulfuric acid electrolyte. Therefore, in order to maximize adhesion to, and protection of, the conductive basis 10, a protective layer 15 comprised of multiple protective coating layers having at least two different polymers is preferred. For example, in order to maximize adhesion between the protective layer 15 and the conductive basis 10, it is preferred that the first layer of protective coating material applied to the conductive basis include a polymer material that exhibits good adhesion to lead-based materials—even if such a material is permeable to a sulfuric acid electrolyte. This first layer of protective coating material may only need to be, for example, about 0.5-1.0 µm in thickness, although a thicker first layer can also be applied. A subsequent layer, or subsequent layers, of protective coating material may then be comprised of a conductive material whose polymer component may exhibit a lesser adhesion to lead-based materials, but an improved resistance to penetrability by the sulfuric acid electrolyte. Consequently, as can be understood, by applying protective coating materials in different layers and by varying the type of polymer present in at least some of those materials, the required combination of protective layer parameters can be most optimally achieved.

As can be observed by reference to FIG. 2, after each layer of a protective coating material layer has been applied to the relevant surfaces of the conductive basis 10, the protective coating material is subjected to a solvent evaporation and subsequent thermal treatment step. First, the protective coating material is allowed to air dry under substantially ambient conditions (i.e., at average room temperature) for approximately two (2) hours—although the air drying time may vary depending on the particular protective coating material composition used and the thickness thereof. The air drying period allows a major portion of the solvent trapped therein to slowly evaporate from the deposited protective coating material layer, and also allows the protective coating material to acquire some degree of solidity.

Figure 3:
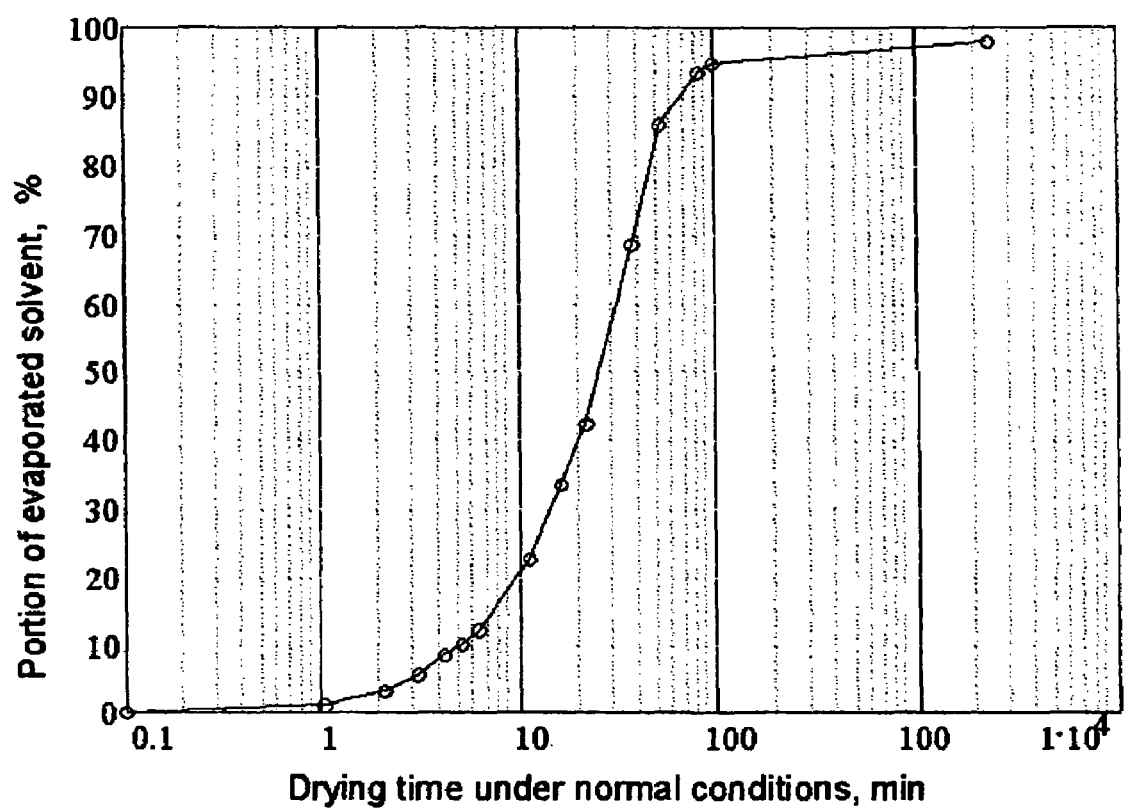
FIG. 3 is a graph showing the amount of solvent evaporated from the protective coating material over the course of its drying time under normal conditions.

As illustrated in FIG. 3, it has been confirmed by testing that the structure and electrical properties of the protective coating material are to a great extent dependent on the solvent removal rate. It has been experimentally established that slowing the rate at which solvent evaporates from the protective coating material results in a protective layer 15 exhibiting good electrical conductivity and having a dense structure (i.e., a solid and substantially non-porous film). This research shows that under normal drying conditions (i.e., at room temperature) up to about 95% of the solvent(s) is removed from the protective coating material volume after 100 minutes. Consequently, the air drying step helps to produce a substantially solid protective layer with no, or only minimal, pores.

Referring again to FIG. 2, it can be seen that subsequent to the air drying (solvent evaporation) step the first layer of protective coating material is subjected to a thermal treatment step. Thermal treatment can be accomplished in a variety of ways, such as by placing the conductive basis 10 with the protective coating material applied thereto in an oven having a controllable temperature. The temperature and treatment time associated with this step may also vary depending on the particular protective coating material composition used and the thickness thereof. In one exemplary method of preparing a current collector of the present invention, the first thermal treatment step takes place at a temperature of between approximately 80-85° C. over a period of between approximately 30-40 minutes.

When constructing a current collector having a protective layer comprised of more than one individual layer of protective coating material, the next layer of protective coating material can be applied after the preceding thermal treatment step has been completed. For example, in the process illustrated by FIG. 2, the second layer of protective coating material is applied after the first thermal treatment step is completed. The second layer and any additional layers of protective coating material are preferably also applied by a method that allows the thickness thereof to be properly controlled. After application, the second layer of protective coating material is subsequently subjected to an air drying (solvent evaporation) step and a thermal treatment step in a manner similar to that of the first layer. The temperatures and treatment times associated with each of these drying steps may again vary depending on the particular protective coating material composition used and the thickness thereof. However, in one exemplary method of preparing a current collector of the present invention, the second layer of protective coating material was air dried at room temperature for approximately two (2) hours and subsequently thermally treated at a temperature of approximately 110° C. over a period of between approximately 60-70 minutes. Additional layers of protective coating material can be applied in a similar way, with the drying times and temperatures adjusted as needed.

EXAMPLE 1

An exemplary current collector was manufactured according to the technique described above. The current collector had conductive basis dimensions of approximately 135×72×0.2 (mm). A protective coating material was deposited to the conductive basis in two separate layers, such that the final protective layer thickness was approximately 50 μm. The conductive basis was manufactured from a lead alloy, namely an alloy comprised of approximately 97% lead and approximately 3% tin. The composition of the current collector protective coating paste was approximately 6.0 weight % carbon powder; 5.2 weight % perchlorovinyl polymer; 8.2 weight % plasticizer; 80 weight % solvent (acetone, n-butyl acetate, toluol); 0.3 weight % dispersant; 0.15 weight % wetting agent (surfactant); and 0.15 weight % antifoaming agent. After thermal treatment of the second of the two protective coating material layers, the composition of the protective layer was 30 weight % carbon powder; 45 weight % perchlorovinyl polymer; and 25 weight % plasticizer.

Once completed, various characteristics of the current collector were measured. Measurements of coating thickness and specific electrical resistance of the protective layer showed both the coating thickness and the specific electrical resistance to be virtually uniform along the entire current collector surface. Specifically, protective layer thickness measured about 50±5 μm, while the average value of specific electrical resistance ($\rho_k$) at the conductive basis/protective layer barrier was determined to be 0.85 Ohm.cm². Since the specific electrical resistance attributable to the conductive basis/protective layer barrier is greater than the specific electrical resistance due to the protective coating material itself, it can be understood that a change in protective layer thickness does not influence the overall specific electrical resistance value.

Measurements of adhesion at different locations along the completed current collector also established that adhesion of the protective coating material to the lead-based conductive basis was quite high along the surface. Further, changes in adhesion occurred within a narrow range of approximately 8-10 kg/cm².

A sample of the protective layer was also separated from the conductive basis in order to perform additional tests. The use of hot probe and Van der Paw techniques showed that both the separated protective layer sample and the protective layer remaining on the conductive basis to have p-type electrical conductivity.

A sample of the protective layer covered current collector was also placed in a sulfuric acid aqueous solution (sulfuric acid) electrolyte ($\rho$=1.26 g/cm³) and maintained there at room temperature for about 120 hours. The sample was thereafter thoroughly washed with distilled water and air dried at approximately 80° C. for 5 hours in order to remove liquid. Afterward, the electrical characteristics of the current collector were measured again. These measurements demonstrated that the specific electrical characteristics of the current collector were virtually unchanged.

In yet other testing, the current collector was maintained in the sulfuric acid electrolyte at a temperature of approximately 65° C. for about 120 hours. After removal, measurement showed that in this case the specific electrical resistance value ($\rho_k$) increased from 0.85 to 0.87 Ohm.cm². The current collector was also subjected to the sulfuric acid electrolyte at a temperature of approximately 80° C. for about 60 hours. In this case, measurement showed the specific electrical resistance to be about 0.91 Ohm.cm². Upon completion of the testing, measurement showed that the p-type conductivity of the protective layer and its adhesion to the conductive basis remained unchanged.

Thus, it can be seen that after quite severe tests of the current collector in a sulfuric acid electrolyte, the specific electrical resistance of the current collector increased by only 1.07 times. Hence, it is obvious that the protective layer effectively prevents the sulfuric acid electrolyte from reaching the surface of the conductive basis and, therefore, protects the surface of the conductive basis from oxidation. It should be equally obvious to one skilled in the art that the insignificant change in specific electrical resistance of the current collector cannot influence the energy characteristics of an electrochemical capacitor having a sulfuric acid electrolyte if such a current collector is installed thereto.

Figure 4:
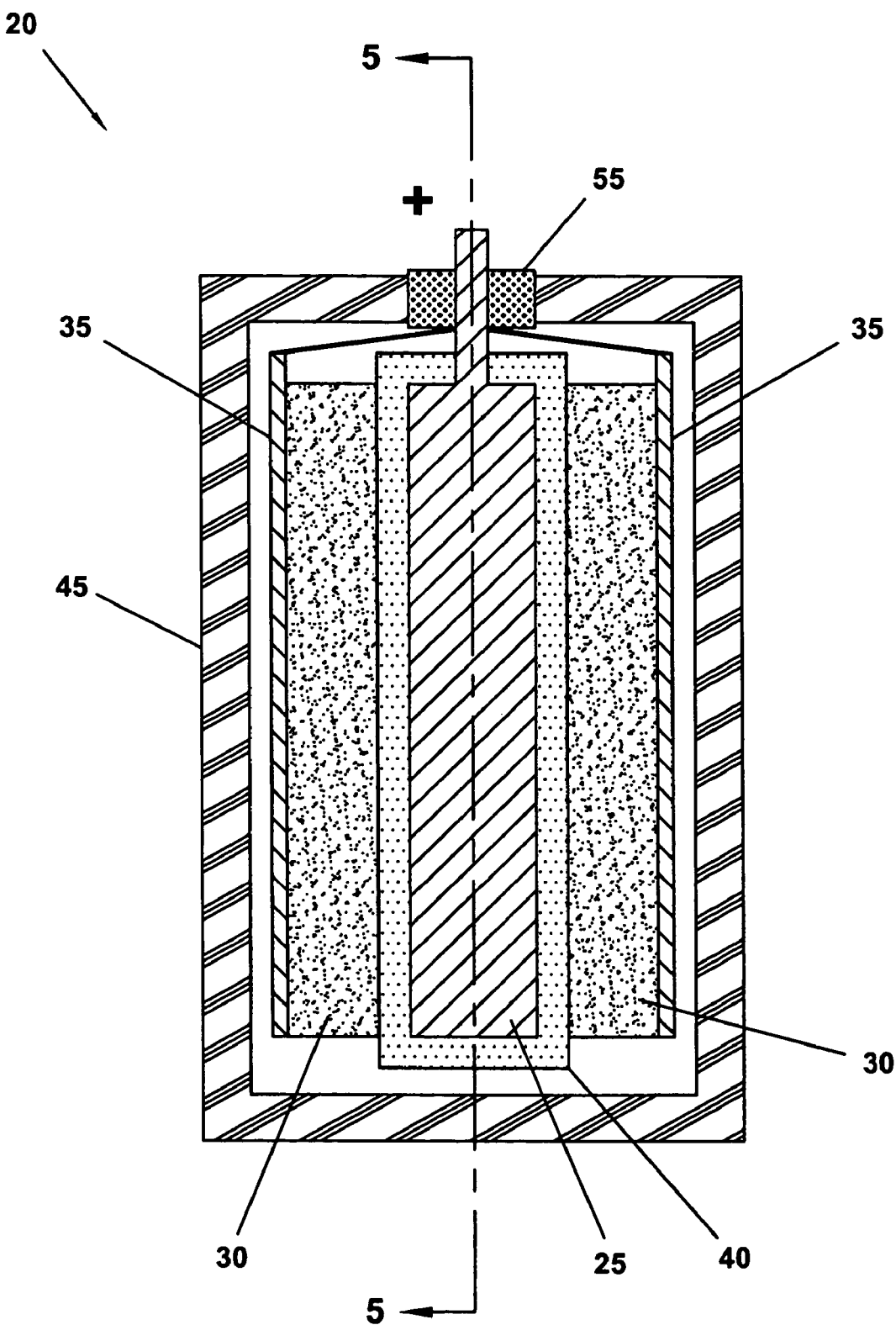
FIG. 4 illustrates a front view, in cross-section, of one embodiment of a single-cell heterogeneous DEL capacitor using a current collector of the present invention.
Figure 5:
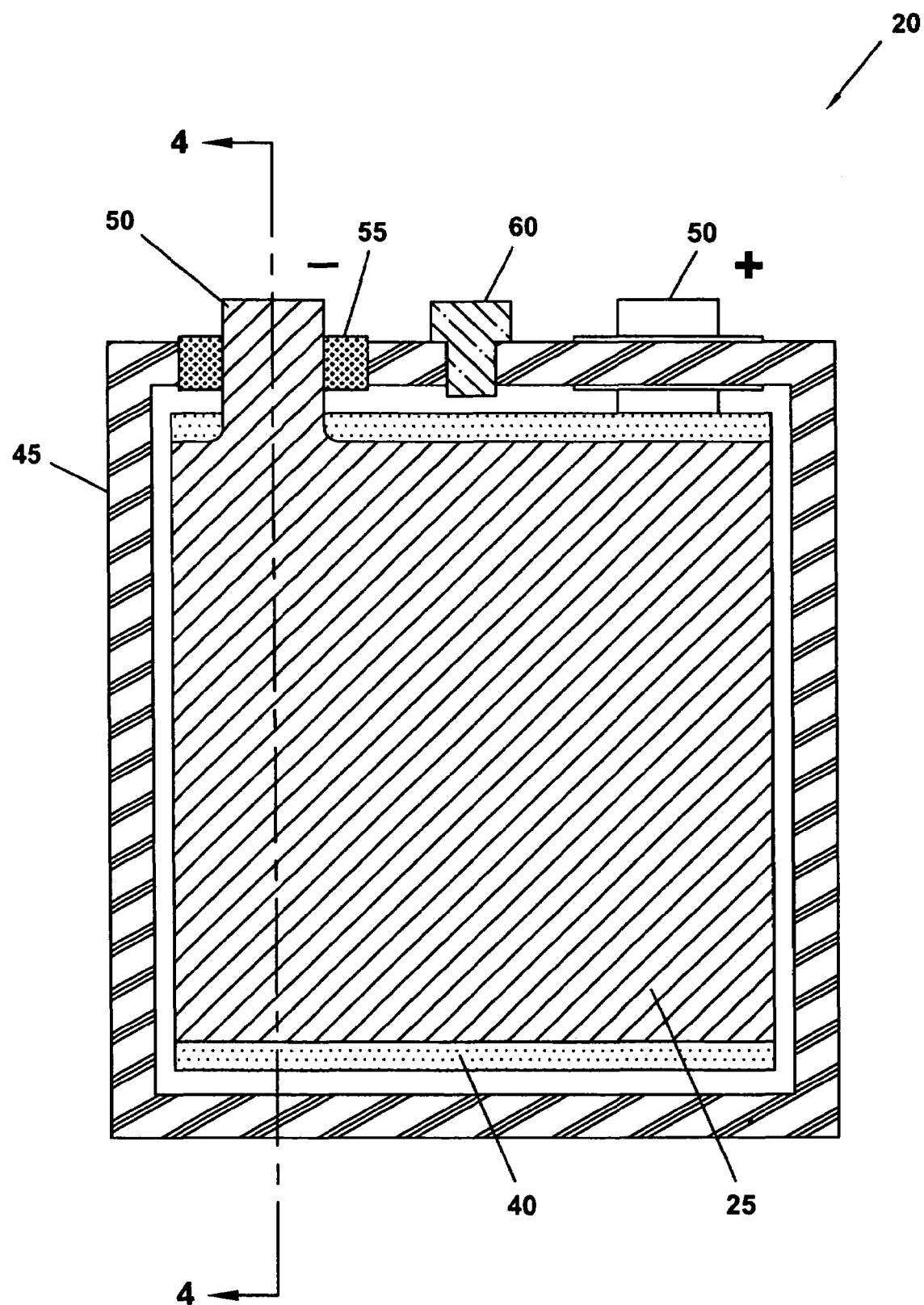
FIG. 5 is a side view, in cross-section, of the capacitor of FIG. 4.

A double electric layer (DEL) heterogeneous electrochemical supercapacitor (HES) 20 constructed for the purpose of testing the current collector of Example 1 is shown in FIGS. 4-5. The HES was tested using a current collector manufactured according to the techniques described above and detailed in Example 1.

The HES 20 can be seen to include a positive (non-polarizable) electrode 25 based on lead dioxide and a pair of negative (polarizable) electrodes 30 having an active mass comprised of an activated carbon material. Each negative electrode 30 also has a current collector 35 of the present invention attached to it active mass. A porous separator 40 substantially surrounds the positive electrode 25 and separates it from the negative electrodes 30. The electrodes 25, 30 and the separator 40 are impregnated with an amount of aqueous sulfuric acid electrolyte having a density of 1.26 g/cm³. The electrode assembly resides in a case 45 through which lugs 50 of the current collectors 35 protrude. The case 45 is sealed against leakage around the lugs 50 by lug seals 55. The HES 20 is also equipped with a safety valve 60.

Activated carbon plates of PAC-MM-100, which is manufactured by Material Methods LLC (USA), were used for the active mass of the negative electrodes 30—although other materials could obviously also be used. The carbon plates had overall dimensions of approximately 135×72×2.0(mm). The specific electrical capacitance, specific weight density and specific electrical resistance of the PAC-MM-100 plates was 750 F/g, 0.38 g/cm³, and 0.44 Ohm.cm, respectively. The carbon plates are of p-type electrical conductivity.

The particular separator 40 used in the HES 20 was an AGM-separator made of RECOMAT 15064XXP, which is manufactured by BERNARD DUMAS, in France. The separator 40 had a thickness of about 0.4 mm.

In order to accomplish accelerated testing of a current collector of the present invention as part of the HES 20, testing was performed at increased temperatures of approximately 60±3° C. The HES 20 was tested with a charge current and discharge current of about 0.75 A, a discharge time of about 3.5 hours, a pause after charge and after discharge of about 5 minutes, and a discharge to voltage of about 0.8V.

During testing, the following characteristics of the HES were measured: (a) Coulomb capacity during charge and discharge; (b) energy during charge and discharge; (c) Coulomb capacity efficiency and energy efficiency; and (d) voltage and Ohmic resistance at the start and end of discharge.

At the beginning of testing, five charge and discharge cycles of the HES 20 were performed at room temperature in order to stabilize and determine its operating parameters. Then the HES 20 was placed in a special installation and heated to approximately 60° C., where the temperature was thereafter maintained at a permanent level of 60±3° C. Upon the completion of 95$^{th}$ cycle, the HES was cooled to room temperature and five additonal charge and discharge cycles were performed.

Measurements showed that at the 5$^{th}$ cycle at room temperature the HES 20 had an electric capacitance of about 8,500 F, a Coulomb capacity of about 2.45 A.h, a discharge energy of about 12.5 kJ, an Ohmic resistance at the start of discharge ($R_{sdch}$) of about 67.3 mOhm and an Ohmic resistance at the end of discharge ($R_{edch}$) of about 41.2 mOhm.

In total, 100 continuous charge and discharge cycles were performed, of which, 90 cycles (from cycle 6 to cycle 96) were performed at a temperature of 60±3° C. The measured characteristics of the HES 20 at the 100$^{th}$ cycle and the 5$^{th}$ cycle (at room temperature) remained substantially without change. After an increase of the HES' temperature to 60±3° C., the measured characteristics increased, and then remained substantially unchanged during the entire cycling period at the 60±3° C. temperature. During the decrease (after 95$^{th}$ cycle) of the HES' temperature to room temperature, the measured characteristics again dropped to the measured values obtained at the 5$^{th}$ cycle.

Ohmic resistance at the start of discharge ($R_{sdch}$) and at the end of discharge ($R_{edch}$) at the 8$^{th}$ cycle (at room temperature of 60±3° C.) measured 64.3 mOhm and 39.3 mOhm, respectively. During cycling, the values of $R_{sdch}$ and $R_{edch}$ decreased at an insignificant rate, and at the last (95$^{th}$) cycle they measured 63.7 mOhm and 38.5 mOhm, respectively.

Cycling of the HES 20 at the temperature of 60±3° C. did not cause any changes in its operating characteristics that could be related to a change in the properties of the current collectors 35. At the 100$^{th}$ cycle (at room temperature), the HES 20 had a measured electrical capacitance of 8,750 F, a Coulomb capacity of 2.46 A.h, a discharge energy of 12.7 kJ, a $R_{sdch}$ of 65.8 mOhm and a $R_{edch}$ of 39.2 mOhm. The small increase in the measured energy characteristics of the HES 20 was related to the improvement of the wettability of the carbon plates of the negative electrodes 30 during its cycling.

Figure 6:
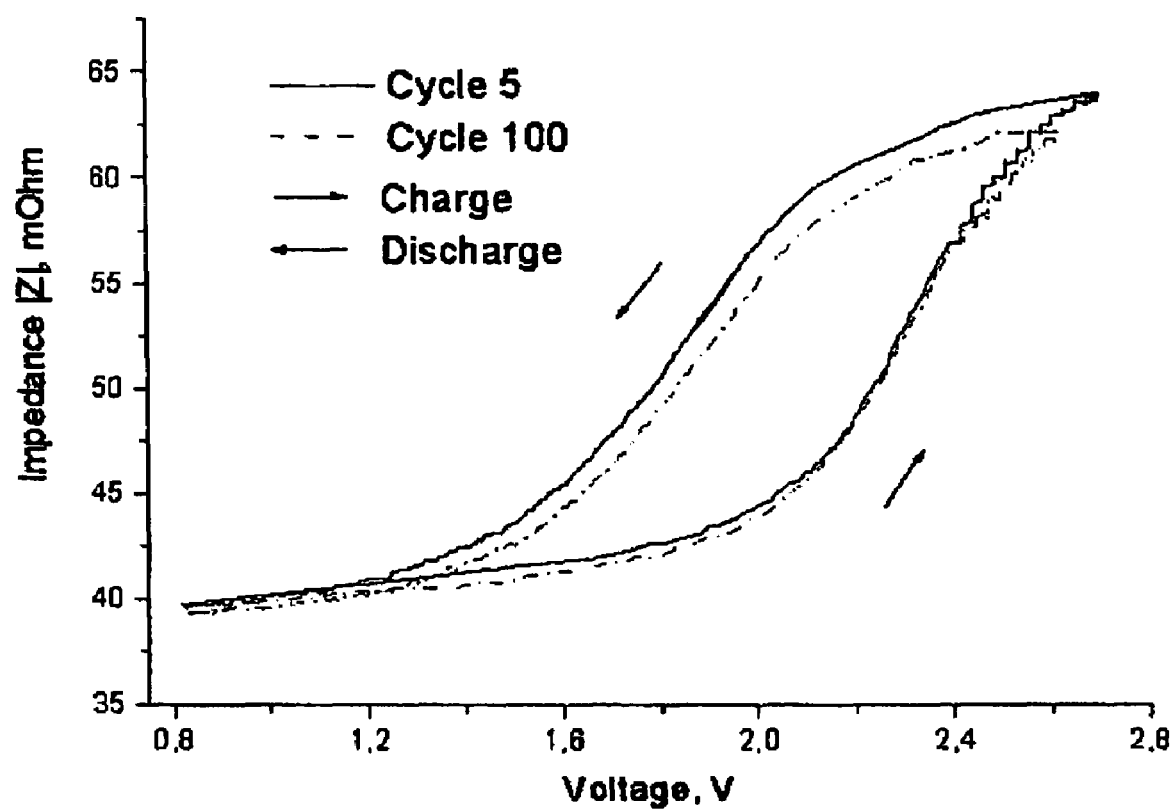
FIG. 6 is a graph showing the impedance of the capacitor of FIGS. 4-5 versus its voltage at charge and discharge.

Measurements of HES impedance during charge and discharge (see FIG. 6) made it possible to determine that: (a) impedance dependence on voltage did not in fact change with the number of cycles over the long cycling period of the capacitor; and (b) there were no oxidation-reduction processes observed on the surface of the negative electrode current collector based on the impedance vs. voltage curve during charge and discharge. Thus, the low internal resistance of the capacitor, the lack of redox processes on the surface of the conductive basis, and the stable dependence of impedance on voltage during long cycling prove the benefit of using a current collector of the present invention.

The electrical characteristics of the protective layer were also tested after cycling of the HES 20. The tests showed that any change in properties of the protective layer of the current collector after the accelerated tests was insignificant. For example, the average value of the specific electrical resistance of the current collector decreased from 0.85 Ohm.cm² to 0.80 Ohm.cm², and the p-type conductivity thereof was retained. It is believed that the slight decrease in specific electrical resistance may be related to the change of the surface state density of the protective layer.

Inasmuch as the negative electrode of the HES 20 used for testing is polarized in a potential range of about 0.9/−0.7V in relation to SHE potential, it is clear that the current collector of the present invention can also be used in a symmetric electrochemical capacitor having an aqueous sulfuric acid electrolyte.

EXAMPLE 2

Another exemplary current collector was manufactured in a manner similar to that described above. The current collector again had conductive basis dimensions of approximately 135×72×0.2(mm). A protective coating material was deposited to the conductive basis in two separate layers, such that the final protective layer thickness was approximately 50 μm. The conductive basis was manufactured from a lead alloy, namely an alloy comprised of approximately 99% lead and approximately 1% tin. The composition of the current collector protective coating paste was approximately 4.0 weight % carbon powder; 9.7 weight % perchlorovinyl polymer; 6.0 weight % plasticizer; 80 weight % solvent (acetone, n-butyl acetate, toluol); 0.1 weight % dispersant; 0.1 weight % wetting agent (surfactant); and 0.1 weight % antifoaming agent. After thermal treatment of the second of the two protective coating material layers, the composition of the protective layer was 20 weight % carbon powder; 52 weight % perchlorovinyl polymer; and 28 weight % plasticizer.

The average values of the specific electrical resistance and adhesion of the protective layer of the current collector of Example 2 were measured as 2.4 Ohm.cm² and 12 kg/cm², respectively. The protective layer had a p-type conductivity.

Figure 7:
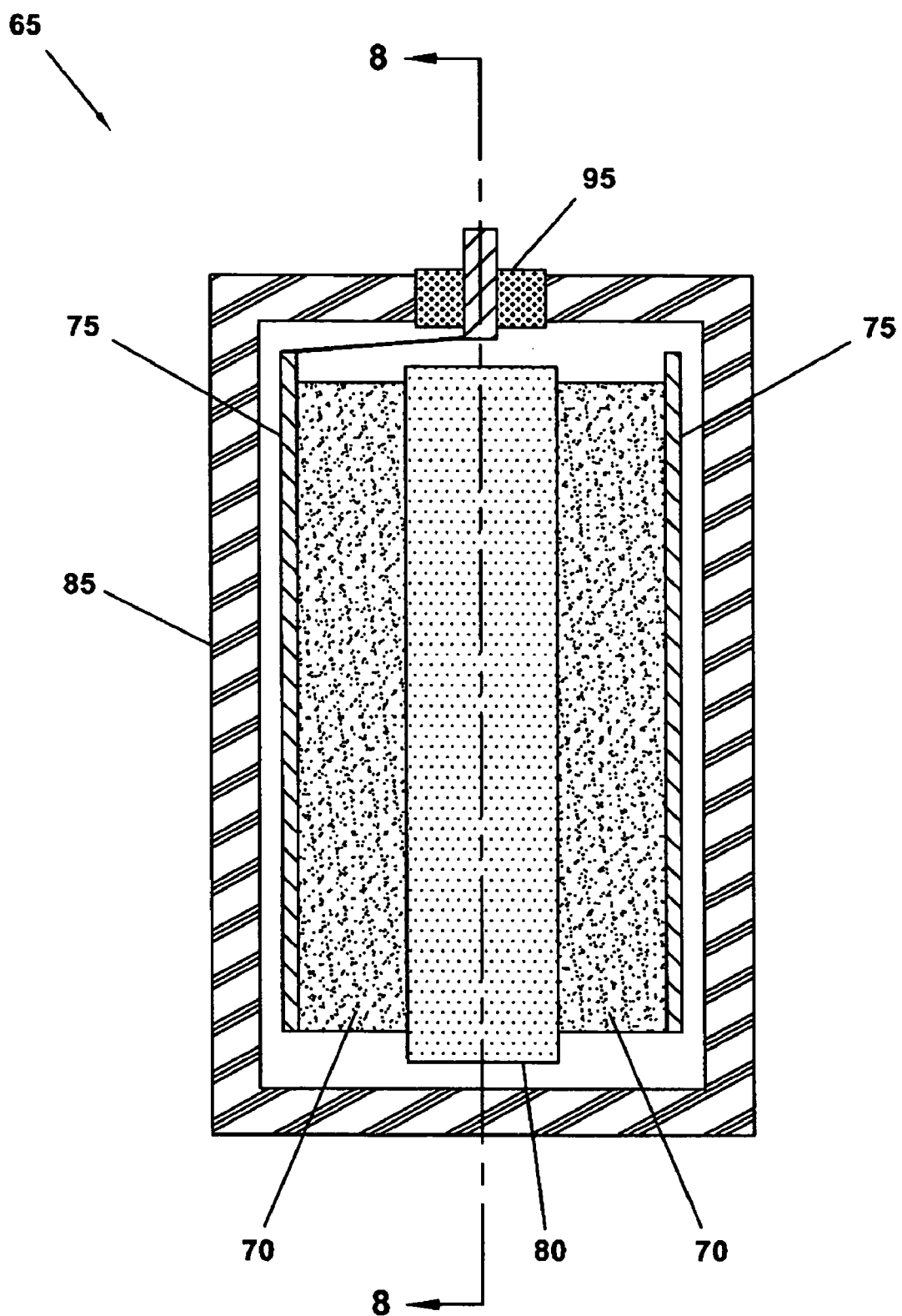
FIG. 7 illustrates a front view, in cross-section, of one embodiment of a symmetric DEL capacitor using a current collector of the present invention.
Figure 8:
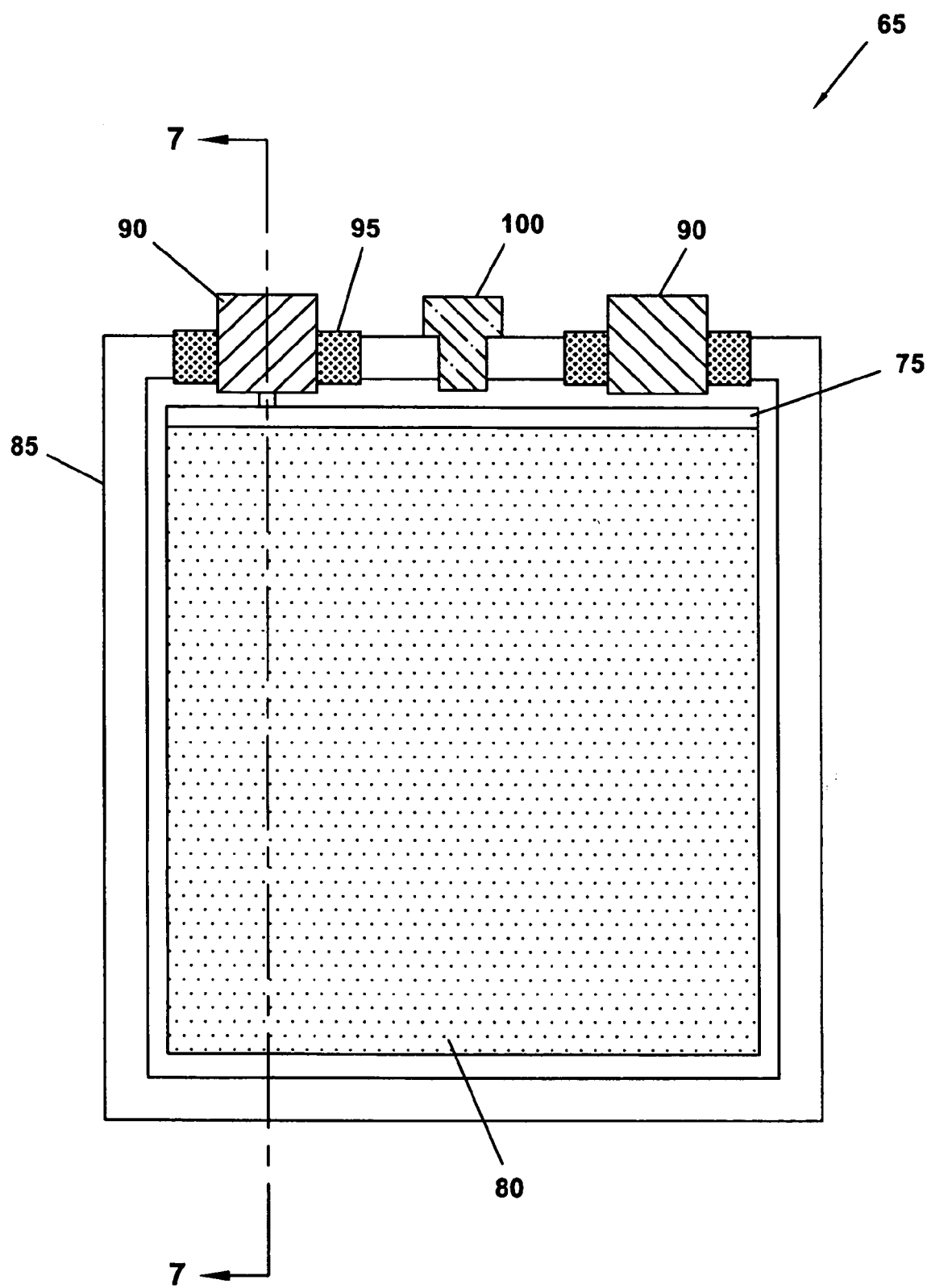
FIG. 8 is a side view, in cross-section, of the capacitor of FIG. 7.

A double electric layer (DEL) symmetric electrochemical supercapacitor 65 constructed for the purpose of testing the current collector of Example 2 is shown in FIGS. 7-8. The symmetric capacitor 65 was tested using a current collector manufactured according to the techniques described above and detailed in Example 2 as the current collector for both the positive and negative electrode thereof.

The symmetric capacitor 65 can be seen to include a pair of porous polarizable electrodes 70 having an active mass comprised of an activated carbon material. Each electrode 70 also has a current collector 75 of the present invention attached to it active mass. A porous separator 80 separates the electrodes 70. The electrodes 70 and the separator 80 are impregnated with an amount of aqueous sulfuric acid electrolyte having a density of 1.26 g/cm$^3$. The electrode assembly resides in a case 85 through which lugs 90 of the current collectors 75 protrude. The case 85 is sealed against leakage around the lugs 90 by lug seals 95. The symmetric capacitor 65 is also equipped with a safety valve 100.

Activated carbon plates of PAC-MM-100 were also used for the active mass of these electrodes 70—although other materials could obviously also be used. The carbon plates again had overall dimensions of approximately 13×72×2.0 (mm). The specific electrical capacitance, specific weight density and specific electrical resistance of the PAC-MM-100 plates was 750 F/g, 0.38 g/cm$^3$ and 0.44 Ohm.cm$^2$, respectively. The carbon plates are of p-type electrical conductivity.

The particular separator 80 used in the HES 20 was again an AGM-separator made of RECOMAT 15064XXP. The separator 80 had a thickness of about 0.4 mm.

The symmetric capacitor 65 was tested at room temperature. In order to increase the influence of oxygen and hydrogen on the tested current collectors 75, a heavy-duty cycling mode was deliberately selected (with a Coulomb efficiency of about 16%). The charge and discharge of the capacitor was performed at a constant current of approximately 0.36A. The Coulomb capacity of the charge and discharge process of the symmetric capacitor 65 had a value of about 1.8 A.h. During charge and discharge, the symmetric capacitor 65 experienced voltage reversal (i.e., the positive electrode of the capacitor became the negative electrode, and the negative electrode became the positive electrode).

During testing, the following characteristics of the symmetric capacitor 65 were measured: (a) energy during charge and discharge; (b) capacitor voltage and the potentials of its electrodes; (c) Ohmic resistance of the capacitor at the start and end of discharge; and (d) capacitor impedance.

The duration of pause after charge and discharge processes was 5 minutes. The tests were performed in a mode of continuous capacitor cycling mode. The number of performed continuous cycles was 100.

The energy characteristics of the symmetric capacitor 65 during cycling remained virtually unchanged. Measurements showed the electric capacitance to be 1,400 F, the Coulomb capacity to be 0.22 A.h, the discharge energy to be 1.188 kJ, the Ohmic resistance value at start of charge ($R_{sch}$) to be 21.3 mOhm, and the Ohmic resistance value at the end of charge ($R_{ech}$) to be 25.2 mOhm.

Figure 9:
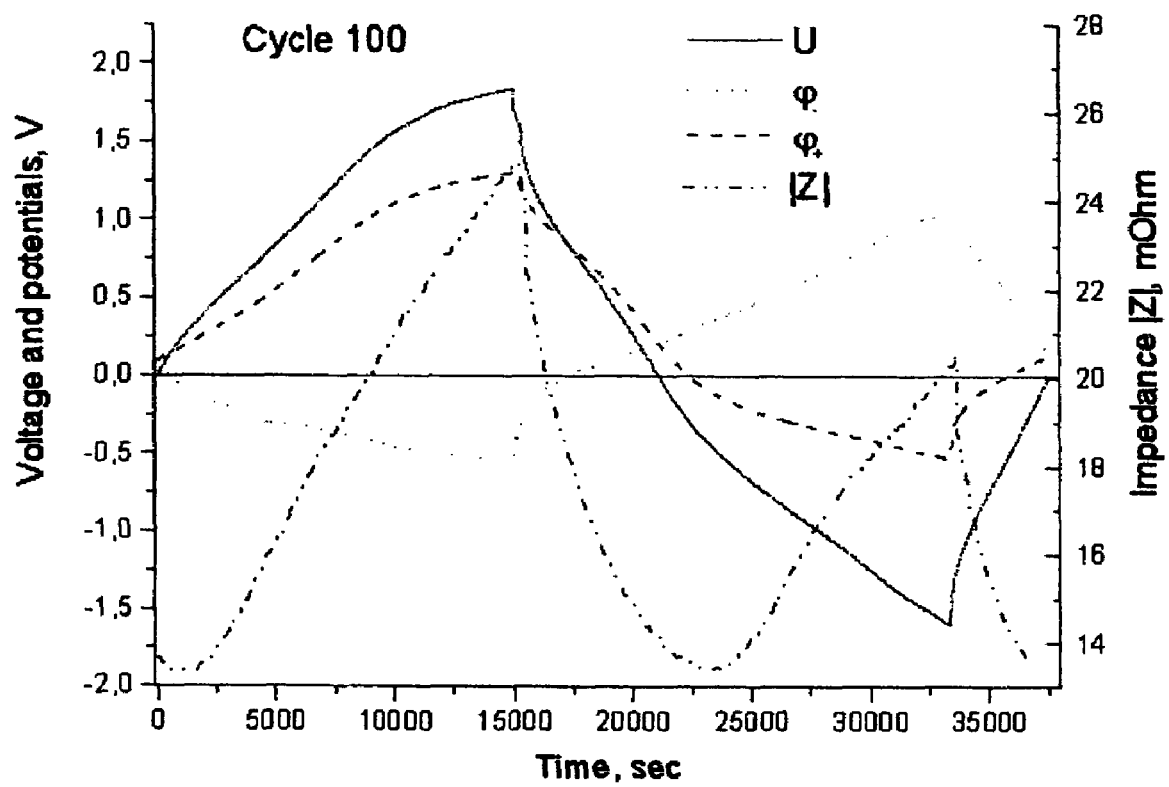
FIG. 9 is a graph showing the dependence of voltage (U), impedance (|Z|) and potential of the positive($\phi_+$) and negative ($\phi_-$) electrodes of the capacitor of FIGS. 7-8 on charge and discharge time in comparison to a reference standard hydrogen electrode (SHE)
Figure 10:
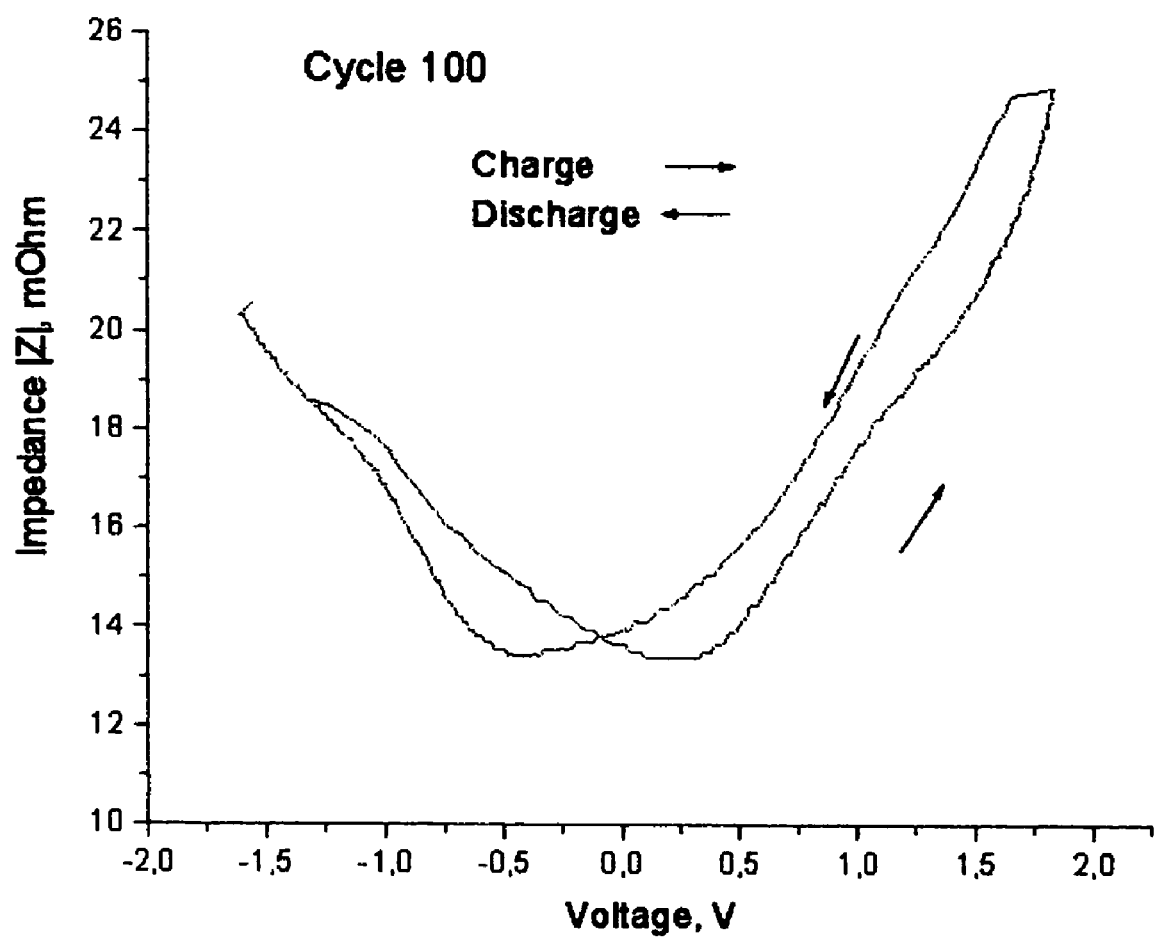
FIG. 10 is a graph showing the dependence of the impedance of the capacitor of FIGS. 7-8 on its voltage during charge and discharge time.

As shown in FIG. 9, the potentials of the capacitor electrodes during charge and discharge vary over a wide range. Based on the impedance vs. voltage curve of FIG. 10, no redox processes associated with the conductive basis of the current collectors were observed during charge and discharge, notwithstanding the heavy-duty cycling mode. This indicates that the protective layer coated to the conductive basis of each current collector effectively operates to prevent oxidation of the conductive basis. This is confirmed by the measurement of the electrical characteristics of the current collectors after cycling of the symmetric capacitor 65. In addition, the electrical, mechanical, chemical and physical characteristics of the current collectors did not change after testing.

Therefore, as can be seen from the foregoing, a protective coating manufactured according to the present invention exhibits a low specific electric resistance and high p-type electrical conductivity. Such a protective coating will prevent an electrochemical capacitor electrolyte, such as a sulfuric acid-based electrolyte, from contacting the surface of the conductive basis of a current collector and will protect the surface of the conductive basis from the effects of redox processes during polarization and depolarization of its associated electrode. The protective coating is also flexible and exhibits good adhesion to the lead or lead alloy materials comprising the conductive basis.

Additionally, the protective coating will provide for high over-voltage of hydrogen and oxygen gassing in a DEL capacitor's sulfuric acid electrolyte. At temperatures from about −40° C. to about +50° C., the protective coating will be stable within a potential range of at least +1.0/−0.7V as compared to the potential of a reference standard hydrogen electrode (SHE) in a sulfuric acid electrolyte. Further, the electrical, electrochemical, physical, mechanical and protective properties of the protective coating will not change as a result of multiple polarization and depolarization within the above range of potentials and temperatures.

Thus, the foregoing description and cited examples show that a current collector of the present invention exhibits high operational efficiency when used in electrochemical capacitors having at least one carbon-based electrode and an aqueous sulfuric acid electrolyte. However, it should also be understood by one skilled in the art that a current collector of the present invention is not limited to such an application and may, in fact, find use in other electrochemical capacitors. For example, and without limitation, it is realized that a current collector of the present invention may be used in the current collectors of both the positive and negative electrodes of a symmetrical electrochemical capacitor with alkaline electrolyte. In a similar way, it is also possible to use a current collector of the present invention (made of Ni) in the positive and negative electrodes of a C/KOH/C symmetrical electrochemical capacitor. Furthermore, a current collector of the present invention may also be used with the negative electrodes (having a conductive basis of Ni, Cu, Fe and other metals) of electrochemical capacitors of a Ni (OH)$_2$/KOH/C system. In addition, it is further realized that a protective layer according to the present invention may be used to protect a current collector conductive basis (particularly an aluminum conductive basis) of both a capacitor and a storage battery having a non-aqueous electrolyte.

Therefore, while certain embodiments of the present invention are described in detail above, the scope of the invention is not to be considered limited by such disclosure, and modifications are possible without departing from the spirit of the invention as evidenced by the following claims:

What is claimed is:

1. A capacitor current collector comprising:
  a conductive basis; and
  a protective coating covering at least part of said conductive basis, said protective coating comprising a conductive composite that includes a conductive carbon powder and a polymer binder, said protective coating for substantially preventing an electrolyte of sulfuric acid aqueous solution from contacting a portion of said conductive basis covered by said protective coating.

2. The current collector of claim 1, wherein said conductive basis comprises lead.

3. The current collector of claim 1, wherein said conductive basis comprises a lead alloy.

4. The current collector of claim 3, wherein said lead alloy comprises lead and tin.

5. The current collector of claim 1, wherein said conductive basis is selected from the group consisting of nickel, copper, iron and aluminum.

6. The current collector of claim 1, wherein said protective coating exhibits p-type conductivity.

7. The current collector of claim 1, wherein said polymer binder is resistant to an aqueous sulfuric acid electrolyte.

8. The current collector of claim 7, wherein said polymer binder comprises perchlorovinyl.

9. The current collector of claim 1, wherein said conductive composite material is applied to said conductive basis as a paste.

10. The current collector of claim 1, wherein said conductive composite material also includes one or more components selected from the group consisting of a plasticizer, a solvent, a dispersant, a wetting agent, and an anti-foaming agent.

11. The current collector of claim 1, wherein said capacitor is a double electric layer electrochemical capacitor.

12. The current collector of claim 11, wherein said capacitor is a heterogeneous electrochemical supercapacitor.

13. The current collector of claim 11, wherein said capacitor is a symmetric electrochemical supercapacitor.

14. A current collector for use in an electrochemical capacitor having an aqueous sulfuric acid electrolyte, comprising:
a conductive basis of lead or a lead alloy; and
a protective layer residing on said conductive basis, said protective layer constructed from one or more layers of one or more protective coating materials, each protective coating material comprising a conductive composite that includes a conductive carbon powder and a polymer binder;
wherein each layer of protective coating material is subjected to a solvent evaporation process and a thermal treatment process prior to deposition of a subsequent layer of protective coating material; and
wherein said resulting protective layer is substantially non-porous and prevents said aqueous sulfuric acid electrolyte from contacting said conductive basis, thereby avoiding oxidation of said conductive basis by said aqueous sulfuric acid electrolyte.

15. The current collector of claim 14, wherein said protective layer exhibits p-type conductivity.

16. The current collector of claim 14, wherein said polymer binder is resistant to said aqueous sulfuric acid electrolyte.

17. The current collector of claim 16, wherein said polymer binder comprises perchlorovinyl.

18. The current collector of claim 14, wherein said conductive composite material is applied to said conductive basis as a paste.

19. The current collector of claim 14, wherein said conductive composite material also includes one or more components selected from the group consisting of a plasticizer, a solvent, a dispersant, a wetting agent, and an anti-foaming agent.

20. The current collector of claim 14, wherein said capacitor is a double electric layer electrochemical capacitor.

21. The current collector of claim 20, wherein said capacitor is a heterogeneous electrochemical supercapacitor.

22. The current collector of claim 20, wherein said capacitor is a symmetric electrochemical supercapacitor.

23. The current collector of claim 14, wherein said protective coating is formed from multiple layers, the first layer of which is comprised of a conductive composite that exhibits good adhesion to a lead-based conductive basis.

24. The current collector of claim 23, wherein said first layer of said protective coating material has a thickness of about 0.5-1.0 µm.

25. The current collector of claim 14, wherein said protective coating is formed from multiple layers, each of which is of substantially equal thickness.

26. The current collector of claim 14, wherein each layer of conductive composite material is subjected to a solvent evaporation process and a thermal treatment process prior to deposition of a subsequent layer of conductive composite material.

27. The current collector of claim 14, wherein said conductive carbon powder has a particle size of between about 300-500 Å prior to said conductive composite being applied to said conductive basis.

28. A capacitor current collector comprising:
a conductive basis; and
a protective coating covering at least part of said conductive basis, said protective coating comprising a conductive composite that includes a conductive carbon powder and a perchlorovinyl polymer binder that is resistant to an aqueous sulfuric acid electrolyte, said protective coating for substantially preventing said aqueous sulfuric acid electrolyte from contacting a portion of said conductive basis covered by said protective coating.

29. The current collector of claim 28, wherein said conductive basis comprises lead.

30. The current collector of claim 28, wherein said conductive basis comprises a lead alloy.

31. The current collector of claim 30, wherein said lead alloy comprises lead and tin.

32. The current collector of claim 28, wherein said conductive basis is selected from the group consisting of nickel, copper, iron and aluminum.

33. The current collector of claim 28, wherein said protective coating exhibits p-type conductivity.

34. The current collector of claim 28, wherein said conductive composite material is applied to said conductive basis as a paste.

35. The current collector of claim 28, wherein said capacitor is a double electric layer electrochemical capacitor.

36. The current collector of claim 35, wherein said capacitor is a heterogeneous electrochemical supercapacitor.

37. The current collector of claim 35, wherein said capacitor is a symmetric electrochemical supercapacitor.

* * * * *

UNITED STATES PATENT AND TRADEMARK OFFICE
CERTIFICATE OF CORRECTION

PATENT NO. : 7,446,998 B2  
APPLICATION NO. : 11/358981  
DATED : November 4, 2008  
INVENTOR(S) : Kazaryan et al.

It is certified that error appears in the above-identified patent and that said Letters Patent is hereby corrected as shown below:

In column 8, line 2, please delete "0.85 Ohm.cm$^2$" and insert -- 0.85 Ohm•cm$^2$ --.

In column 8, line 35, please delete "0.87 Ohm.cm$^2$" and insert -- 0.87 Ohm•cm$^2$ --.

In column 8, line 39, please delete "0.91 Ohm.cm$^2$" and insert -- 0.91 Ohm•cm$^2$ --.

In column 9, line 15, please delete "0.44 Ohm.cm" and insert -- 0.44 Ohm•cm --.

In column 9, line 44, please delete "2.45 A.h" and insert -- 2.45 A•h --.

In column 10, line 4, please delete "2.46 A.h" and insert -- 2.46 A•h --.

In column10, line 26, please delete "0.85 Ohm.cm$^2$" and insert -- 0.85 Ohm•cm$^2$ --.

In column 10, line 27, please delete "Ohm.cm$^2$" and insert -- Ohm•cm$^2$ --.

In column 10, line 62, please delete "2.4 Ohm.cm$^2$" and insert -- 2.4 Ohm•cm$^2$ --.

In column 11, line 20, please delete "13×72×2.0" and insert -- 135×72×2.0 --.

In column 11, line 23, please delete "0.44 Ohm.cm$^2$" and insert -- 0.44 Ohm•cm$^2$ --.

In column 11, line 35, please delete "1.8 A.h" and insert -- 1.8 A•h --.

In column 11, line 53, please delete "0.22 A.h" and insert -- 0.22 A•h --.

Signed and Sealed this

Twentieth Day of January, 2009

JON W. DUDAS  
*Director of the United States Patent and Trademark Office*

UNITED STATES PATENT AND TRADEMARK OFFICE
CERTIFICATE OF CORRECTION

PATENT NO. : 7,446,998 B2  
APPLICATION NO. : 11/358981  
DATED : November 4, 2008  
INVENTOR(S) : Kazaryan et al.

Page 1 of 1

It is certified that error appears in the above-identified patent and that said Letters Patent is hereby corrected as shown below:

Title Page, Item (30) insert -- Foreign Application Priority Data: Jun. 24, 2005 (WO) PCT/RU05/000349. --

Signed and Sealed this
Eighth Day of February, 2011

David J. Kappos  
*Director of the United States Patent and Trademark Office*